United States Patent [19]

Hughes et al.

[11] Patent Number: 4,514,554

[45] Date of Patent: Apr. 30, 1985

[54] PETROLEUM RESIN AND PRESSURE SENSITIVE ADHESIVE FORMULATIONS UTILIZING SAME AS TACKIFIER

[75] Inventors: Vincent L. Hughes; Francisco M. Benitez, both of Baton Rouge, La.

[73] Assignee: Exxon Research and Engineering Co., Florham Park, N.J.

[21] Appl. No.: 469,097

[22] Filed: Feb. 23, 1983

[51] Int. Cl.$^3$ ............................................. C08F 210/14
[52] U.S. Cl. .................................... 526/339; 526/237; 526/290; 525/99
[58] Field of Search ....................... 526/339, 237, 290; 525/99

[56] References Cited

U.S. PATENT DOCUMENTS

| | | |
|---|---|---|
| 3,577,398 | 5/1971 | Pace et al. |
| 3,853,826 | 12/1974 | St. Cyr ................................ 526/339 |
| 3,872,064 | 3/1975 | Pace .................................... 526/339 |
| 4,008,360 | 2/1977 | Kudo et al. |
| 4,098,983 | 7/1978 | Osborn ................................ 526/339 |
| 4,173,699 | 11/1979 | Borg . |
| 4,230,842 | 10/1980 | Bullard .............................. 526/339 |
| 4,358,574 | 11/1982 | Hughes . |

Primary Examiner—Paul R. Michl
Attorney, Agent, or Firm—Roland A. Dexter

[57] ABSTRACT

This invention relates to pressure sensitive adhesive formulations which include a block copolymer of styrene and isoprene such as Kraton ® D and a tackifying resin derived from petroleum feedstock polymerized in the presence of aluminum chloride and having a $\overline{M}w$ ranging from 800 to 960, a $\overline{M}n$ ranging from 500 to 600 with a $\overline{M}w/\overline{M}n$ ratio of from 1.3 to 1.9, a softening point of 78° to 81° C. and a glass transition temperature of about 50° C. whereby the adhesive formulations have a rolling ball tack of less than 5 cm., a 180° peel of higher than 3 pounds per inch, a 90° quick stick of higher than 3 pounds per inch and a Polyken tack of higher than 1,000 g/cm$^2$.

8 Claims, No Drawings

PETROLEUM RESIN AND PRESSURE SENSITIVE ADHESIVE FORMULATIONS UTILIZING SAME AS TACKIFIER

This invention relates to a petrolum resin having excellent tackifying properties for block copolymers of styrene and isoprene. More particularly, it relates to a petroleum resin having a number average molecular weight of from 500 to 600, a softening point of about 80° C. and a glass transition temperature of about 50° C. whereby said resin can provide the requisite tackification of pressure sensitive adhesives containing said block copolymer, a method of producing said petroleum resin and pressure sensitive adhesive compositions containing said resin and said block copolymer.

BACKGROUND OF THE INVENTION

Broadly speaking, adhesives used in packaging can be classified into four categories: water based, solvent based, pressure sensitive and hot melt adhesives. Of these four, currently, the water based are used most extensively. Usually the water based adhesives are based on emulsion polymers and are applied to porous cellulosic substrates. Energy from the outside, in some fashion, is applied to the system to evaporate the water in order that a strong bond may be formed. Beside this energy requirement for the formation of the bond, there is another complication with the use of water based adhesive. For a uniform coating, a good uniform wetting of the substrate surface is desired, which is not easily achieved. For the solvent based types, the requisite evaporation of the solvent introduces the solvent into the environment which both requires energy and can be deleterious to the surrounding environment.

The key requirements for pressure sensitive adhesives are that they should have good cohesive and tackifying properties at ambient conditions. These adhesives should also have good flow characteristics if they are to be used in the bulk state, otherwise they should possess sufficient consistency when dissolved in suitable solvents so that they can be coated or sprayed on the surfaces to be bonded. Usually these adhesives are prepared from a mixture of resin, polymer and a plasticizer (when required to soften the adhesive and enhance the aggressive tack).

Certain commerical block copolymers such as Shell's Kraton ® and Phillip's Solprene ® are widely used as the polymers in pressure sensitive adhesives. These adhesives prepared from blends incorporating these polymers have very good adhesive and strength properties at room temperature and can be processed by conventional melt coating and extrusion techniques because of their good flow characteristics. Because of this excellent combination of properties exhibited by the ABA type of block copolymer when B represents a polydiene or a polyolefin block and A represents a polystyrene block, the use of Kratons ® for various pressure sensitive adhesive applications is growing in the industry.

However, these referenced block copolymers when used in combination with tackifying resins for pressure sensitive adhesive blends, have a serious drawback when blended with a major proportion of resin. Under this condition in order to realize the tackifying properties of the petroleum resin component of the blend, it is necessary to incorporate substantial levels of a plasticizer, usually a naphthenic oil whereby the aggressiveness of tack and other requisite properties of these tertiary blends can be controlled. The use of plasticizers results in a number of deleterious effects on the making and using of pressure sensitive adhesive compositions including long term degradation of adhesion.

The petroleum resins generally used as tackifiers for Kraton ® type block copolymers include those produced according to the teachings of U.S. Pat. No. 3,577,398 wherein the polymeric resinous composition is obtained from the polymerization of a feedstock containing a mixture of piperylene, i.e. pentadiene-1,3 and 2-methyl-2-butene in the presence of anhydrous particulate aluminum chloride and a hydrocarbon diluent. The resinous products are reported as having softening points of about 80° C. to about 110° C. (col. 2, line 62) although upon stream stripping the softening point are raised to a range of about 90° C. to about 110° C. (col. 2, lines 69–70).

Unfortunately, as indicated above, the use of a major proportion of these resins as a tackifier for Kraton D type block copolymers requires from 5 to 30 weight percent of plasticizer in the tertiary blend to provide a useful pressure sensitive adhesive composition. The plasticizer can be introduced to modify the A(polystyrene) block e.g. aromatic process oil or the B (polydiene or polyolefin) block, e.g. naphthenic process oil.

Other teachings which show petroleum resins derived from feedstocks having as a major amount the blend of piperylene and 2-methyl butenes include U.S. Pat. No. 4,173,699 (see Examples 1–5) and U.S. Pat. No. 4,358,574, both of which have examples which describe petroleum resin products which are functionally inadequate as tackifiers for said block copolymers unless used in a tertiary blend containing a plasticizer, usually up to 10 weight percent of a naphthenic oil.

U.S. Pat. No. 4,008,360 describes a process for producing a petroleum resin useful as tackifying resin in a binary adhesive based on natural rubber by adjusting the composition of the C$_5$-fraction feedstock so that the weight ratio of acylic diolefins to monoolefins is from 0.40 to 0.70 and the weight ratio of cyclic diolefins to monoolefins is 0.07 to 0.35 when polymerized in the presence of aluminum chloride. Comparative Example No. 3 shows that going outside the latter ratio results in a resin having a softening point of 80° C. and a molecular weight (($\overline{M}n$) as measured by VPO method) of 950 and of decreased utility as a tackifier since the rolling ball tack of the binary adhesive blend was adversely affected.

It is an object of this invention to provide an improved petroleum resin for tackification of pressure sensitive adhesive blends containing an ABA block copylmer; preferably of a binary blend of said resin and said copolymer.

STATEMENT OF THE INVENTION

It has been discovered that the polymerization of a C$_5$ fraction feedstock having a major proportion of a mixture of piperylene and 2-methyl butenes with a total diolefin to monoolefin weight ratio of about 0.47, a total diolefin to 2-methyl butenes weight ratio of about 0.9 and a total cyclic diolefin to monoolefin ratio of about 0.02 in the presence of 1.5 weight percent particulate aluminum chloride produces a petroleum resin having a weight average molecular weight ($\overline{M}w$) of 800 to 960, a number average molecular weight ($\overline{M}n$) of 500 to 600, a ($\overline{M}w$)/($\overline{M}n$) ratio of at least 1.3, a softening point of about 80° C. and a glass transition temperature of about 50° C. which in a binary blend with an ABA block copolymer of polystyrene-polyisoprene-polystyrene provides a useful pressure sensitive adhesive composition. Both ($\overline{Mw}$) and ($\overline{Mn}$) are measured by gel permation chromatograph using a polyisobutylene standard and the glass transistion temperature (Tg) is a penetration measurement with a thermomechanical analyzer (Perkin-Elmer Thermal Analysis System 4).

Thus in accordance with this invention there is provided a petroleum resin containing a major proportion of the aluminum halide catalyzed polymerizate of the combination of pentadiene 1,3 and 2-methyl butenes, a number average molecular weight ($\overline{Mn}$) of from 500 to 600, a weight average molecular weight ($\overline{Mw}$) of from 800 to 960, a $\overline{Mw}/\overline{Mn}$ ratio of 1.3 to 1.9 and a softening point ranging from 78°–81° C.

There is also provided a process for producing a petroleum resin having a number average molecular weight ($\overline{Mn}$), softening point and glass transition temperature suitable for use as a tackifying additive for an adhesive composition containing a block copolymer of polystyrene and polyisoprene which comprises polymerizing in the presence of aluminum chloride a $C_5$–$C_6$ fraction from steam cracked naphtha or light refinery streams, said $C_5$–$C_6$ fraction having a composition comprising a major proportion of piperylene and 2-methyl butenes, a total diolefin to 2-methyl butenes weight ratio of from 0.8 to 1.0 and a total cyclic diolefin to monoolefin weight ratio of 0 to 0.03 and recovering a petroleum resin having a $\overline{Mn}$ of from 500 to 600, a softening point of from 78° C. to 81° C. and a glass transition temperature of from 45° C. to 55° C.

The petroleum resin of this invention makes possible in a binary blend a pressure sensitive adhesive formulation which comprises (a) a block copolymer of polystyrene polyisoprene and polysytrene and (b) about 125 to 175, preferably 150, parts by weight per 100 parts of weight of said block copolymer of a petroleum resin containing a major proportion of the aluminum halide catalyzed polymer of the combination of pentadiene 1,3 and 2-methyl butenes, a number average molecular weight ($\overline{Mn}$) of from 500 to 600, a weight average molecular weight ($\overline{Mw}$) of from 800 to 960, a $\overline{Mw}/\overline{Mn}$ ratio of 1.3 to 1.9 and a softening point ranging from 78°–81° C. whereby a rolling-ball tack of from 2 to 4 cm and a polyken tack of 1600 gm/cm$^2$ to 1900 gm/cm$^2$ are obtained.

DETAILED DESCRIPTION OF THE INVENTION

In practicing this invention to produce the novel petroleum resin which has been found to provide tackification in binary blends to ABA (i.e. Kraton ® D type) copolymers, both the feedstock composition and polymerization conditions are critical if one is to obtain the resin possessing the requisite molecular weight and distribution, softening point and preferred glass transition temperature properties.

FEEDSTOCK

The feedstock is obtained as a $C_5$–$C_6$ fraction from steam cracked naphtha or light refinery streams with a boiling range of from 20° C. to 80° C. and a major proportion of piperylene and 2-methyl butenes as the polymerizable content of said fraction. This $C_5$–$C_6$ fraction has been adjusted in a suitable way to provide a weight ratio of total diolefin to 2-methyl butenes of from 0.8 to 1.0, preferably 0.9 and a total cyclic diolefin to monoolefin weight ratio of no greater than 0.03, preferably no greater than 0.02 and optimally from 0 to 0.02. The total diolefins as hereabove referred to are those represented by cyclopentadiene, cis and trans 1,3-pentadiene and isoprene. The total monoolefins include both five and six carbon hydrocarbons such as 2-methyl-1-butene, 2-methyl-2-butene, cyclopentene, 1-pentene, cis and trans-2-pentene, trans-4-methyl pentene, 2-methyl pentene and 1-hexene. The total 2-methyl butenes include both isomers of the above butenes. The total cyclic diolefins include all five and six carbon hydrocarbons such as 1,3-cyclopentadiene. The total diolefin to monoolefin weight ratio would usually be in the range of 0.45 to 0.50; however, when other less reactive monoolefins are present in the feedstock this latter ratio range is extended without prejudice to the product resin from 0.3 to 0.6.

The above said adjustment of weight ratio between the diolefins and monoolefins or 2-methyl butenes may be effected by any of the customary procedures without any particular restriction, such as, for example, removal of isoprene by precise fractional distillation; adjustment of the concentration of diolefins and monoolefins by extractive or azeotropic distillation; removal of diolefins by thermal dimerization as described in U.S. Pat. No. 4,358,574; and addition of a $C_5$ fraction which has been deprived of diolefins (i.e. so called spend $C_5$ fraction). A typical feedstock composition is set forth hereafter in Example 1.

POLYMERIZATION

In carrying out the polymerization reaction, the hydrocarbon mixture is brought into contact with the anhydrous aluminum chloride catalyst. Generally, the catalyst is used in particulate form. Generally, a particle size in the range of from about 5 to about 200 mesh size in used although larger or smaller particles can be used. The amount of catalyst used is critical and ranges from 1.0 to 2.0, preferably 1.5 weight percent. The catalyst may be added to the olefinic hydrocarbon mixture or the hydrocarbon mixture may be added to the catalyst. The reaction can be conducted continuously or by batch process techniques generally known to those skilled in the art.

The reaction should also be carried out at a pressure of from 10 to 80, preferably 20, psi. Since the average molecular weight and molecular weight distribution of the product polymerizate is critical to the invention, the other reaction parameters of temperature which ranges from 50° C. to 100° C., more usefully from 60° C. to 75° C., preferably about 68° C. and time of polymerization which ranges from 0.5 to 2.0 hours, preferably 1 hour, are considered critical.

The reaction is conveniently carried out in the presence of a diluent because the reaction is usually exothermic and the resulting product is viscous. However, with adequate mixing and cooling, the temperature can be controlled and reaction conducted with only sufficient diluent to maintain good transfer out of the heat of polymerization. The diluent may be introduced as a component of the feedstock for resinification, e.g. in the example alkanes are introduced as a significant (about 35%) component of the piperylene rich feed stream. Various other diluents which are inert in that they do not enter into the polymerization reaction may be used. Representative examples of inert diluents are aliphatic hydrocarbons such as pentane, hexane and heptane, aromatic hydrocarbons such as toluene and benzene, and unreacted residual hydrocarbons from the reaction.

PRODUCT RESINS

The resulting polymeric product can be considered a synthetic hydrocarbon resin which has in its backbone structure a high degree of substituted 1,4-cyclohexene and cyclohexane type of rings. Such rings come about from the backbiting which occurs when a feedstock containing a large percentage of 1,3-dienes (piperylenes) are polymerized cationically with a Lewis acid such as aluminum chloride and utilizing 2-methylbutenes for chain termination. The polymerizate product is characterized by a number average molecular weight ($\overline{Mn}$) of from 500 to 600, a weight average molecular weight ($\overline{Mw}$) of of from 800 to 960, a $\overline{Mw}/\overline{Mn}$ ratio of 1.3 to 1.9 and a softening point ranging from 78°–81° C.

BLOCK COPOLYMERS

The block copolymers of the instant compositions are ABA type block copolymers of (A) polystyrene and (B) a polydiene which is typically selected from the group consisting of polybutadiene and polyisoprene. As examples, block copolymers are manufactured by Shell Chemical Company and sold under the trade name: Kraton®-D. An extensive discussion of said block copolymers and formulation into adhesives can be found in Rubber Chemistry and Technology, 55, pages 208–218 (1981).

PRESSURE SENSITIVE ADHESIVE

The pressure sensitive adhesive is generally a blend of the petroleum resin described herein which functions as a tackifiers in amounts ranging from 125 to 175, preferably about 150 parts with 100 parts of the ABA block copolymer. This pressure adhesive formulation generally includes a phenolic antioxidant such as Irganox 1010 in amounts ranging from 1 to 5, generally 2, weight percent based on the total amount of the resin-copolymer components.

The pressure sensitive adhesives are coated onto the tape or other body by application of the molten binary blend of resin and copolymer or solvent-coated at solids contents of up to 55 weight percent using standard solvent coating equipment. This latter solvent coating formulation contains dissolved block copolymer and tackifying resin in a naphtha solvent such as toluene or hexane in a concentration level of about 45 to 65 weight percent based on the total weight of said formulation.

The advantages of the pressure sensitive adhesive (PSA) compositions of the present invention can be more readily appreciated by reference to the following examples.

EXAMPLE 1

As an Example of this invention a petroleum resin was prepared by polymerizing a $C_5$ to $C_6$ fraction having a boiling point of 22° C. to 65° C. having the composition shown on Table I.

TABLE I

| Typical Composition of Hydrocarbon Fraction | |
|---|---|
| 2-Methylbutane | 28% by weight |
| 2-Methyl-1-butene | 4% by weight |
| Isoprene | 1% by weight |
| 2-Methyl-2-Butene | 19% by weight |
| Cyclopentadiene | 1% by weight |
| Cis/trans 1,3-pentadiene | 20% by weight |
| Cyclopentene | 7% by weight |
| Other $C_5/C_6$ Olefins | 13% by weight |
| Other Alkanes | 7% by weight |
| Total diolefins to 2-methyl butenes (wt. ratio) = | 0.96 |
| Total cyclic diolefins to monoolefins (wt. ratio) = | 0.02 |
| Total diolefins to monoolefins (wt. ratio) = | 0.51 |

Four hundred grams of the fraction shown on Table I were fed into a reactor containing 6.0 g of anhydrous $AlCl_3$ dispersed in 10 ml of benzene and equipped with a stirrer, a condenser and a thermometer. As the addition of the feed to the catalyst starts, the temperature of the reaction increases slowly until a maximum temperature of 68° C. was achieved. The addition of the feed usually takes place during 30 minutes followed by 30 minutes of further reaction.

At the end of the 1 hour reaction time the reaction was quenched by adding 200 ml of distilled water. The total reaction contents were placed in a separatory funnel and washed twice with 2 liters of a 3 to 1 mixture to water to isopropanol.

The now clean dilute polymerizate was placed in a two-necked flask and heated under nitrogen to 195° C. to volatilize the unreacted olefins and alkanes leaving behind a mixture of oligomers and the hydrocarbon resin. This mixture is further stripped by steam to separate the oligomers from the resin. This separation was carried out at 250° C. until 250 ml of steam condensate were collected in the receiving flask leaving behind 140 g of resin having the properties outlined in Table II.

TABLE I

| Typical Composition of Hydrocarbon Fraction | |
|---|---|
| Softening Point (ring and ball method ASTM E-26) | 80° C. |
| Cloud Point (20/40/40) | 60° C. |
| Gardner Color (50 wt. % resin in toluene) | 6 |
| $\overline{Mw}$ | 893 |
| $\overline{Mn}$ | 556 |
| $\overline{Mw}/\overline{Mn}$ | 1.6 |
| Tg (glass transition temperature as measured by thermo mechanical analysis) | 53° C. |

EXAMPLES 2 AND 3

Two pressure sensitive adhesive formulations were each prepared by dissolving by agitation 100 weight units of Kraton ® D block copolymer purchased from Shell Chemical Company, Houston, Tex., 2 weight units of a commerical phenolic antioxidant Irganox 1010 purchased from Ciba-Geigy Corporation, Summit, N.J. and the indicated weight units of the resin of the invention in 55 weight units of toluene. The adhesive was cast from the test formulation onto a 1.5 mil thick polyethylene terephthalate (Mylar ®) film to provide a dry adhesive film thickness of 1.5 mil. The results are shown in Table III.

TABLE III

PRESSURE SENSITIVE ADHESIVE FORMULATION RESULTS

| | Example 2 | Example 3 | |
|---|---|---|---|
| Formulation PHR* | | | |
| Kraton D (1107) | 100 | 100 | |
| Table I Resin | 150 | 125 | |
| Antioxidant | 2 | 2 | |
| Test Results | | | Acceptable Value |
| Rolling ball tack, cm (PSTC Test #6) | | | |
| Initial | 3.1 | 2.7 | <5, lower preferred |
| Aged** | 2.9 | 2.9 | <5, lower preferred |
| 180° C. Peel, lb/inch (PSTC #1) | | | |
| Initial | 5.3 | 4.7 | >3, higher preferred |
| Aged** | 4.8 | 4.9 | >3, higher preferred |
| 90° Quick Stick, lb/inch PSTC Test #1A | | | |
| Initial | 4.2 | 3.4 | >3, higher preferred |
| Aged** | 3.5 | 2.8 | >2, higher preferred |
| Polyken Tack, g/cm$^2$ (ASTMD-2979) | | | |
| Initial | 1,726 | 1,737 | >1,000, higher preferred |
| Aged** | 1,791 | 1,501 | >1,000, higher preferred |
| Melt Viscosity, cPs | 14,500 | 23,500 | |

(PSTC Tests 1 and 6 are published by Pressure Sensitive Tape Council, Glenville, ILL 60025)
*PHR refers to "parts hundred rubber" which herein refers to copolymer as the rubber
**Aged seven days in an oven at 158° F.

EXAMPLES 4,5,6,7 AND 8

Table IV shows the effects that resin softening point and molecular weight have on the results obtained on pressure sensitive adhesive formulations consisting of 100 PHR of Kraton ® D(1107) and 125 PHR of hydrocarbon resin.

TABLE IV

Pressure Sensitive Adhesive Formulation Results With Different Softening Point Resins

| Formulation PHR* | 4 | 5 | 6 | 7 | 8 |
|---|---|---|---|---|---|
| Kration ® D (1107) | 100 | 100 | 100 | 100 | 100 |
| Resin A | 125 | 125 | — | — | — |
| Resin B | — | — | 125 | — | — |
| Resin C | — | — | — | 125 | — |
| Resin of Example 1 | — | — | — | — | 125 |
| Naphthenic Oil | — | 10 | — | — | — |
| Antioxidant | 2 | 2 | 2 | 2 | 2 |
| Results | | | | | |
| Rolling ball tack, cm (PSTC Test #6) | | | | | |
| Initial | 30+ | 4.2 | 12.1 | 2.8 | 2.7 |
| Aged** | 11.6 | 4.1 | 3.6 | 3.0 | 2.9 |
| 180° Peel, lb/inch (PSTC Test #1) | | | | | |
| Initial | 5.0 | 5.4 | 4.3 | 3.3 | 4.7 |
| Aged** | 5.0 | 5.8 | 4.3 | (A.T.) | 4.9 |
| 90° Quick Stick lb/inch (PSTC Test #1A) | | | | | |
| Initial | 3.1 | 3.4 | 3.1 | 2.0 | 3.4 |
| Aged** | 5.2 | 2.9 | 2.4 | 2.2 | 2.8 |

*As in Table III
**Aged in an oven for seven days at 158° F.
Resin A is a commercial hydrocarbon resin having Softening Point = 93° C., $\overline{Mw}$ = 1650; $\overline{Mn}$ = 720; $\overline{Mw}/\overline{Mn}$ = 2.3
Resin B an experimental resin having a Softening Point = 83° C.; $\overline{Mw}$ = 1000; $\overline{Mn}$ = 640; $\overline{Mw}/\overline{Mn}$ = 1.6
Resin C is an experimental hydrocarbon resin having a Softening Point = 71° C.; $\overline{Mw}$ = 760; $\overline{Mn}$ = 500; $\overline{Mw}/\overline{Mn}$ = 1.5
(A.T.) = Undesirable adhesive transfer Further, when the average molecular weight and softening point of the resin used in the formulation is high (Resin A and Resin B), the resins do not lower the modulus and the glass transition temperature of the formulation enough to impart aggresive tack as measured by the high rolling ball tack numbers. When high molecular weight resins are used in this type of PSA formulation (Resin A), it is necessary to add approximately 10 PHR of a naphthenic oil to reduce the rolling ball tack number to a useful value. The addition of naphthenic oils to formulations is deleterious due to oil migration with time and eventual loss of the desired formulation properties.

When the softening point of the hydrocarbon resin and its molecular weight is too low (Resin C), rolling tack has a useful value but the cohesive strength decreases as indicated by the observed undesirable adhesive transfer. This reduced cohesive strength is seen in the lower values observed for this formulation containing Resin C in the 180° C. peel test and the 90° quick stick test. Adhesive transfer which is undesirable for these adhesive systems is manifested when a low molecular weight resin is used.

This invention in its broader aspect is not limited to the specific details shown and described, and departures may be made from such details without departing from the principles of the invention and without sacrificing its chief advantages.

What is claimed is:

1. A petroleum resin containing a major proportion of the aluminum halide catalyzed polymer of the combination of pentadiene 1,3 and 2-methyl butenes, a number average molecular weight ($\overline{Mn}$) of from 500 to 600, a weight average molecular weight ($\overline{Mw}$) of from 800 to 960, a $\overline{Mw}/\overline{Mn}$ ratio of 1.3 to 1.9 and a softening point ranging from 78° C. to 81° C.

2. The petroleum resin according to claim 1 wherein the feedstock of said polymerizate has a cyclic diolefin to monoolefin weight ratio of no greater than 0.03 and a total diolefin to 2 methyl butenes weight ratio of from 0.8 to 1.0.

3. The petroleum resin according to claim 1 having a thermal glass transition temperature of from 45° C. to 55° C. and said $\overline{Mw}/\overline{Mn}$ ratio is 1.6.

4. A process for producing a petroleum resin having a number average molecular weight ($\overline{Mn}$), softening point and glass transition temperature suitable for use as a tackifying additive for an adhesive composition containing a block copolymer of styrene and isoprene which comprises polymerizing in the presence of aluminum chloride a $C_5$–$C_6$ fraction from steam cracked naphtha or light refinery streams, said $C_5$–$C_6$ fraction having a composition comprising a major proportion of piperylene and 2-methyl butenes, a cyclic diolefin to monoolefin weight ratio of no greater than 0.03 and a total diolefin to 2-methyl butenes weight ratio of from 0.8 to 1.0 and recovering a petroleum resin having a $\overline{Mn}$ of from 500 to 600, a softening point of from 78° C. to 81° C. and a glass transition temperature of from 45° C. to 55° C.

5. The process according to claim 4 wherein said polymerization is in the presence of from 1.0 to 2.0 weight percent of aluminum chloride for from 0.5 to 2 hours at a temperature of from 50° to 100° C. at a pressure of from 10 to 80 psi.

6. A pressure sensitive adhesive formulation which comprises (a) a block copolymer of styrene isoprene and styrene and (b) about 125 to 175, preferably 150, parts by weight per 100 parts of weight of said block copolymer of a petroleum resin containing a major proportion of the aluminum halide catalyzed polymerizate of the combination of pentadiene 1,3 and 2-methyl butenes, a number average molecular weight ($\overline{Mn}$) of from 500 to 600, a weight average molecular weight ($\overline{Mw}$) of from 800 to 960, a $\overline{Mw}/\overline{Mn}$ ratio of 1.3 to 1.9 and a softening point ranging from 78°–81° C. whereby a rolling-ball tack of from 2 to 4 cm and a polyken tack of 1600 gm/cm² to 1900 gm/cm² are obtained.

7. A pressure sensitive adhesive formulation according to claim 6 containing up to 2 weight percent of an antioxidant.

8. A pressure sensitive adhesive formulation according to claim 6 containing a naphtha solvent, said block copolymer and petroleum resin being dissolved in said solvent at a concentration level of 35 to about 55 weight percent based on the total weight of said composition.

* * * * *